G. F. LYNCH.
Car-Axle Box.

No. 52,181.  Patented Jan. 23, 1866.

Witnesses:
James Hutter
J. C. Walker

Inventor:
George F. Lynch

G. F. LYNCH.
Car-Axle Box.
No. 52,181.
3 Sheets—Sheet 2.
Patented Jan. 23, 1866.
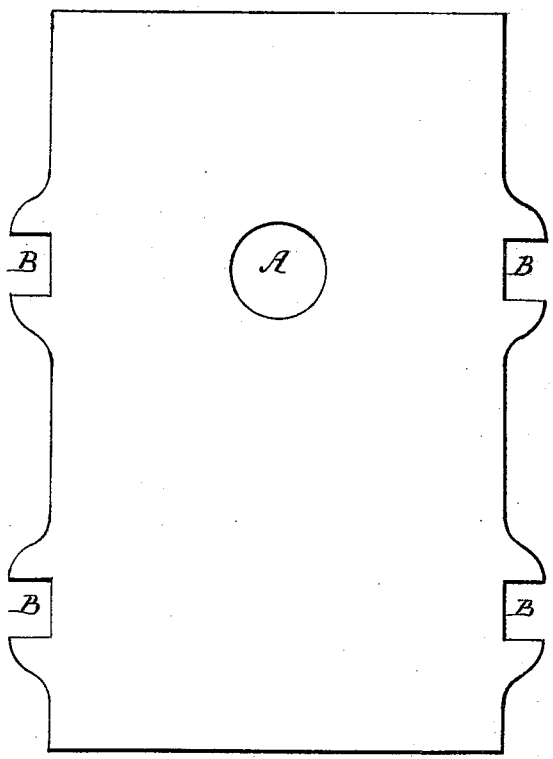
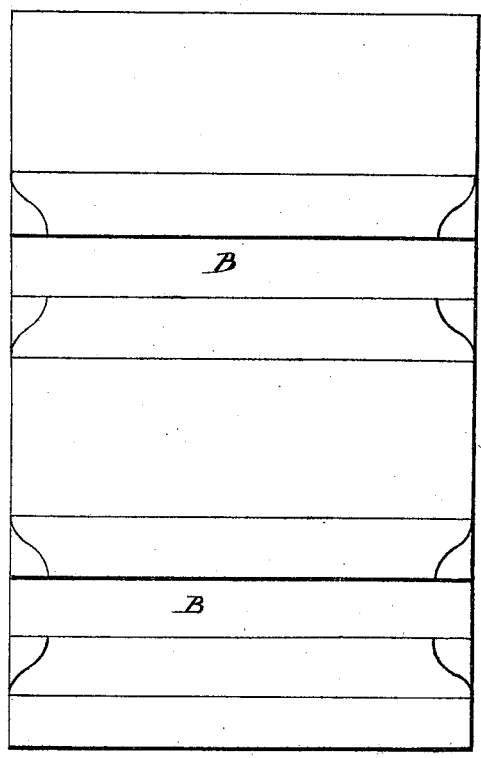
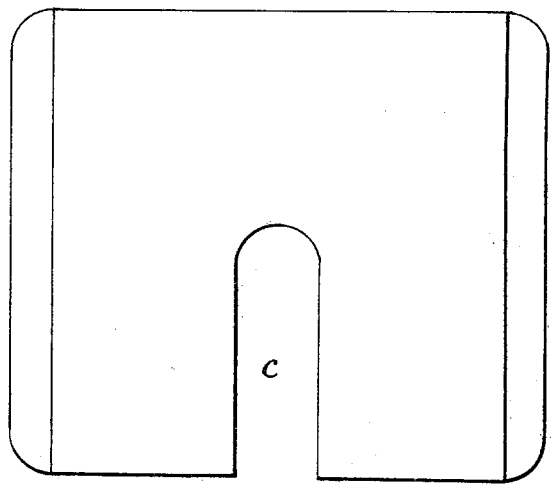
Witnesses:
Inventor:
George F Lynch.

G. F. LYNCH.
Car-Axle Box.

No. 52,181.

Patented Jan. 23, 1866.

3 Sheets—Sheet 3.

Witnesses:
James Hukof
A. P. Walker

Inventor:
George F. Lynch.

UNITED STATES PATENT OFFICE.

GEORGE F. LYNCH, OF MILWAUKEE, WISCONSIN.

IMPROVED RAILROAD-CAR BOX.

Specification forming part of Letters Patent No. 52,181, dated January 23, 1866.

*To all whom it may concern:*

Be it known that I, GEORGE F. LYNCH, of Milwaukee, in the county of Milwaukee, in the State of Wisconsin, have invented a new and useful Improvement in Railroad-Car Boxes; and I do hereby declare that the following is a full and exact description thereof, reference being had to the accompanying drawings, and to the letters of reference marked thereon.

The nature of my invention consists in so shaping the outer surfaces of the boxes as to enable them to vibrate upon their centers sufficiently to avoid cramping and flattening the ends of the friction-rollers, and in also providing the boxes with india-rubber springs, in order to lessen the shock upon them caused by the lateral motion of the cars, and consequently the shock upon the cars themselves.

The advantages of my invention are, first, that the cars supplied with my improved boxes run much easier, or with much less draft; second, that the necessity for lubrication is almost entirely avoided; and, third, that the cars and car-boxes and their attachments are much less racked and wear far better.

From actual experiment and test made upon the Milwaukee city railroads for the past year, where all the cars have been supplied with these boxes, it has been ascertained that the draft labor of the horses has not been to exceed one-half the labor they were required to perform while the old style of car-box was used; that one tablespoonful of lubricating oil per month is sufficient for each box, and that the cars and boxes require not half the former repair, while the motion of the cars is much more pleasant to passengers. These cars run every day, from six to seven o'clock in the morning, till ten to twelve o'clock at night, at the rate of six to seven miles per hour.

To enable others skilled in the art to make and use my invention, I will proceed to describe its construction and operation.

Figure 1:
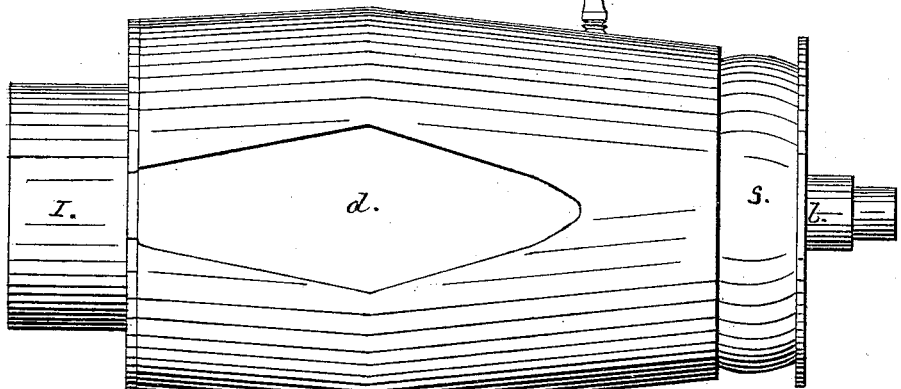
Figure 2:
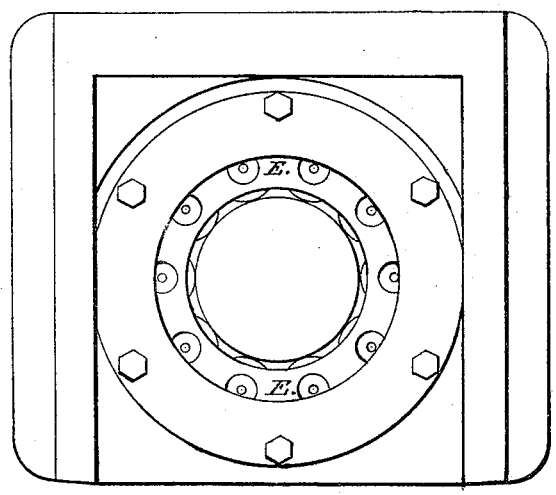
Figure 3:
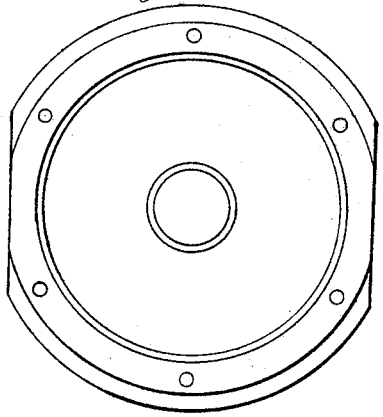

I construct my box in two main parts. I construct, first, a strong outer metallic case, (represented in Figures 1, 2, and 3, Plate 1, Fig. 2, Plate 2, and Fig. 1, Plate 3.) Fig. 1, Plate 1, is a plan view of the top; Fig. 2, a plan view of one side, with its pedestal-grooves; Fig. 3, a plan view of the outer end, and Fig. 1, Plate 3, a vertical longitudinal section of the case, and of the car-box with all its parts, and the axle-journal in place and position, while Fig. 2, Plate 2, is an inner end view of the case, and of the car-box proper in place within the same, as supplied with the frame of friction-rollers and their outer packing-ring. This outer case I term the "pedestal-case." The bottom and inner end of it are left open, as in Fig. 2, Plate 2, and Fig. 1, Plate 3. The case, with its pedestal-grooves, should be cast solid or in one piece.

A, Fig. 1, is a simple hole in the top of the case, which should be made large enough to allow of working the thumb-screw in the top of the car-box, as shown at $a$, Fig. 1, Plates 2 and 3.

B B, Figs. 1 and 2, Plate 1, are rib-grooves formed on the sides of the case to receive the feet of the pedestals which hold the case in position and attach it to the car-body or trucks. C, Fig. 3, Plate 1, is a slot for purposes hereinafter mentioned. This case is designed to rest upon and over the box proper and afford it its bearings.

I next cast my car-box proper of an ovoidal or elliptical form, truncated at each end, as shown in Figs. 1, Plates 2 and 3. To prevent the turning of the box with the axle of the car-wheels it is flattened somewhat on its vertical sides, so as to form two vertical and parallel surfaces or ridges at the center, as shown at $d$, Fig. 1, Plate 2. The middle of this flattened space, however, (at the center of the box,) should be left slightly more prominent than the ends, in order that the ends of the box may vibrate or play horizontally, to a small extent, upon the sides of the pedestal-case.

The success or utility of my invention depends very materially upon the external form of the box as here described, and as illustrated by the drawings, or upon the equivalent device hereinafter mentioned. If the box were not so formed as to easily vibrate upon its center bearings against the top and side plates of the pedestal-case, so as readily to adapt itself and the frame of friction-rollers within it to the accidental direction of the wheel-axles, any sudden elevation or depression, or vibration backward or forward of one end of the axle (while the opposite wheel was in any way confined) would cramp, jam, and flatten the ends of the friction-rollers of the frame on the other end of the axle, and thus destroy their practical efficacy. An equivalent preventive of this difficulty may, however, be found in shaping the box proper rectangularly and with parallel surfaces, and making the inner top and side surfaces of the pedestal-case convex, or furnishing them with convex ribs, so that the center of the box only may bear against and vibrate upon them; but by adopting this expedient the weight of the box and case is increased and their compass enlarged. The cavity of the box must be turned out perfectly smooth and true, and of sufficient size and depth to admit the axle-journal and also the cylindrical frame of friction-rollers to be employed, and which is to surround the journal.

Figure 5:
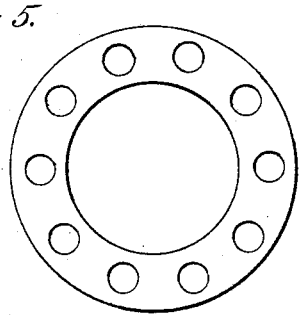
Figure 4:
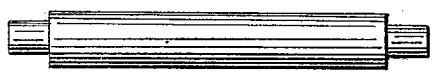
Figure 5:
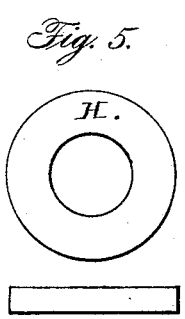
Figure 4:
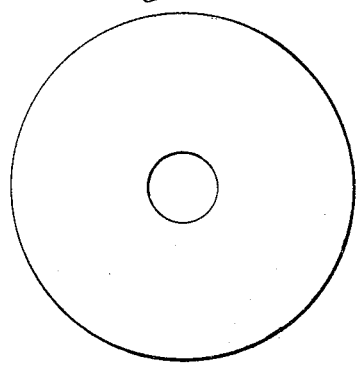
Figure 2:
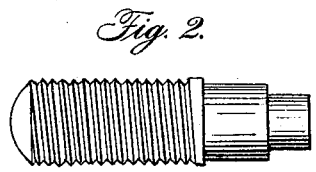
Figure 3:
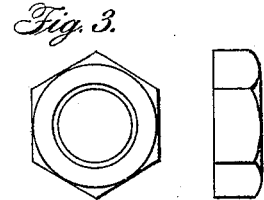
Figure 1:
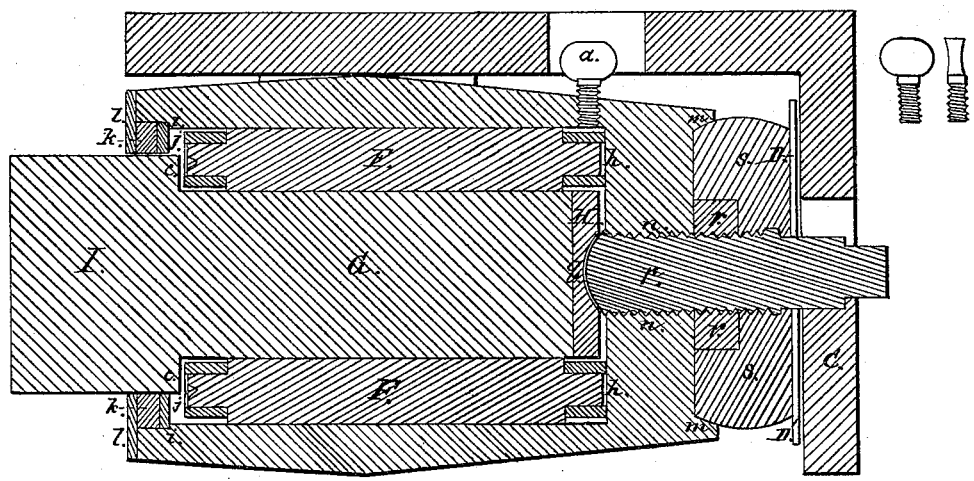
Figure 6:
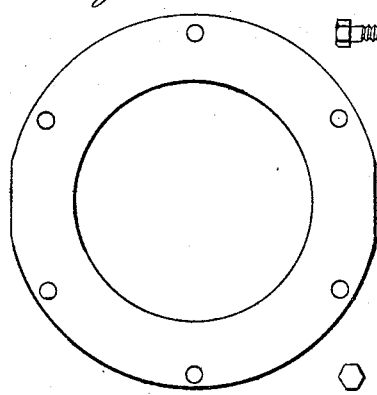
Figure 8:
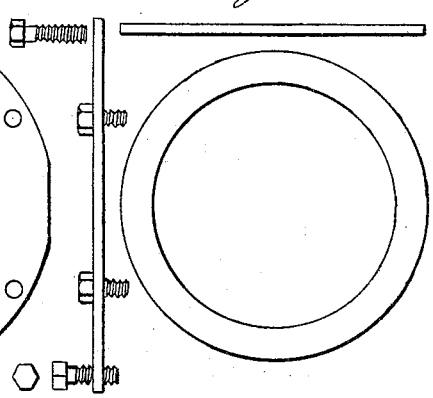
Figure 7:
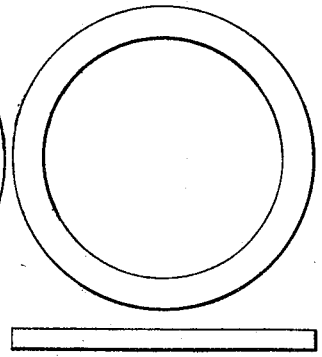

Of the frame of friction-rollers five views, or partial views, are given in the drawings. Fig. 4, Plate 2, shows one of the rollers detached. Fig. 5 is a plan face view of one of the end rings and a fragmentary transverse section of the frame-work.

E E, Fig. 2, is an inner end view of the whole frame, and F F, Fig. 1, Plate 3, is a longitudinal section thereof. The outer diameter of the end rings should be less than the diameter of the box-cavity, and the inner diameter greater than that of the axle-journal, so that the rings may work clear, both of the box and the axle-journal. I make these rings of brass and the rollers of iron or steel. The frame of rollers should be of sufficient size to surround and lightly embrace the axle-journal, with its inner periphery, while its outer loosely fills the cavity of the box. Hence, of course, the space between the journal and the inner surface of the box will regulate the diameter of the rollers.

The construction of the frame is very simple. Two rings of brass (or iron, if preferred) are formed, as indicated in the drawings referred to. Through the substance of these rings holes are truly and correspondingly bored, as shown in the drawings, of a number corresponding with the number of rollers to be employed in the frame. The rollers are formed as shown in Fig. 4, Plate 2, and their ends or journals are inserted in the holes of the rings, (where they should fit loosely,) which completes the frame.

The frame of rollers should be a little shorter than the axle-journal G and washer H, Figs. 1 and 5, Plate 3, so that it may not work in end contact either with the shoulder of the axle at $c\ c$ or the outer end of box-cavity at $h\ h$, but may have some play endwise. Directly over the outer end of the roller-frame I bore a small hole through the wall of the box, for lubricating purposes. This hole is opened or closed by means of a thumb-screw, as shown at $a$, Fig. 1, Plate 3, or by means of any other equivalent device.

Figure 8:
Figure 7:
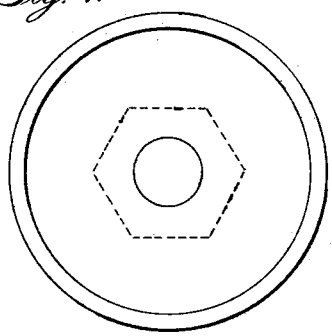
Figure 6:
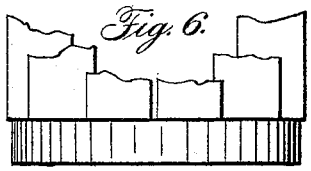

The frame of rollers thus constructed is placed in the cavity of the box which is open at the inner or base end. This end of the box being open the lubricating matter supplied would, of course, immediately run out and be wasted if no means were adopted to prevent it. To obviate this difficulty I adopt the following expedient: I construct the box with a cavity about one inch longer than the axle-journal G and washer H combined, so as to extend inwardly beyond the axle-shoulder $c\ c$. At the inner or base end of the cavity, for the length of half to three-fourths of an inch, I turn out the wall of the cavity so as to make it larger in diameter, and to form a square shoulder all round, as shown at $i\ i$, Fig. 1, Plate 3. Upon this shoulder, within the enlarged cavity, I place metallic ring. (Shown in Fig. 8, Plate 3, in the position shown at $j\ j$, Fig. 1, same plate.) This ring should fill the diameter of the enlarged cavity with its outer edge, and surround but barely touch the body of the axle-shaft I with its inner edge. Upon this metallic ring I next place, within the enlarged cavity, the india-rubber ring, Fig. 7, same plate, in the position shown at $k\ k$, Fig. 1. This latter ring should be a little thicker, when not compressed, than it appears in the drawings in place. Over this rubber ring, and over and upon the inner end of the box, I next place metallic ring, Fig. 6, Plate 3, in the position shown at $l\ l$, Fig. 1, same plate, and secure it there by means of screws, as shown in Fig. 6, Plate 3, and Fig. 2, Plate 2, or by means of other equivalent devices. This last-named ring should not quite touch the wheel-axle I, which it must also surround, and which, for the space embraced by rings $j$, $k$, and $l$, should be made round and smooth. When ring $l$ is screwed down to and upon the end of the box it compresses india-rubber rings $k$, and forces inwardly its inner edge tightly upon the wheel-axle, thus forming a perfect packing against the escape of the lubricating matter.

In the external face of the outer end or vertex of the box a shallow cavity is formed, as shown in Fig. 1, Plate 3. This will, of course, leave a projecting edge or rim around the cavity, as shown at $m\ m$, same figure and plate. Through the center of the substance or wall of the outer end of the box a hole is made and a female screw cut therein, as shown at $n\ n$, Fig. 1, Plate 3. Through this hole the set-screw, Fig. 2, same plate, is firmly screwed in the position shown at P, same figure and plate. The point of this set-screw is rounded so as to form the segment of a sphere, in order that it may work in a corresponding cavity or depression formed in the center of washer, Fig. 5, in the position shown at $q$, Fig. 1, Plate 3. This washer is a circular steel plate or disk of exactly the same diameter of the axle-journal G, and is to be placed and worked against the point or end of the same and held in position against it by the set-screw mentioned. The design of this combination of the set-screw and washer is to keep the axle-journal and car-box at all times in their proper relation to each other, and to compensate or equalize any eccentric tremulousness of the axle-journal by allowing the point of it to slide upon the washer, thus avoiding the shaking or tilting of the box, which must occur if a cavity or depression in the point or end of the journal itself were worked on the rounded point of the set-screw. The head of the set-screw bolt is made square, and is extended outward through slot C and beyond the end plate of the pedestal-case, so as to be worked by a wrench.

When the point of the axle-journal becomes in any degree worn the washer may be set up to it again by means of the wrench and set-screw.

The set-screw bolt should be of steel also. It is furnished with a jam or lock nut, Fig. 3, Plate 3, in the position shown at $r\,r$, Fig. 1. After the set-screw and its jam-nut are screwed to their position I then place over and around them, and upon the end of the box, within rim $m\,m$, the thick india-rubber spring, Figs. 7 and 8, Plate 2, in the position shown at $s$, Fig. 1, Plate 2, and $s\,s$, Fig. 1, Plate 3. This rubber spring I denominate the "shock-spring." Then outside of the shock-spring, and between it and the end plate of the pedestal-case, I place the circular metallic plate or disk, Fig. 4, Plate 3, in the position shown at $t$, Fig. 1, Plate 2, and at $t\,t$, Fig. 1, Plate 3. This plate I call the "shock-plate." With this the construction of my invention is completed.

When completed, and all their parts arranged as herein described, the boxes are slipped onto the axle-journals, the pedestal-cases are placed over and upon the boxes, when the pedestals, which are secured by the appropriate means to the side timbers of the trunks or to the main sills of the car-body, are let down and their pendants or feet slide into the grooves on the pedestal-cases, where they are to play with the spring of the trucks or car-body.

When the car is in motion and its wheels are revolving of course their axle-journals roll upon the friction-rollers within the car-boxes, while the rollers reciprocally roll upon the axle-journals and upon the inner surface of the boxes, thus avoiding to the fullest practical extent all friction between the journals and their boxes and hence avoiding to a great extent the necessity for lubrication.

In order to lubricate the boxes and journals the thumb-screw $a$ or other stop is removed and oil applied through the hole $a$ by means of a can with a curved nozzle.

To cleanse the boxes, should they get foul, a little benzine or naphtha may be poured into them, and after it has dissolved the gums or other foul matter (which it will do with a few revolutions of the wheels) it may be allowed to escape through other holes at the bottom and near the inner ends of the boxes, similar to those at $a$, and with which, and with a thumb-screw, each box should be furnished.

I do not claim as any part of my invention a railroad-car box; nor do I claim the cylindrical frame-work of friction-rollers of itself, herein described, as this has been known and used before in other combinations; but What I do claim as my invention, and seek to secure by Letters Patent, is—

1. The construction of railroad car-boxes in two distinct but dependent parts, substantially in the manner and for the purposes herein described, set forth, and explained.

2. The truncated, ovoidal, or elliptical form of the railroad-car box, substantially as herein set forth and described.

3. The combination of set-screw, Fig. 2, jam-nut, Fig. 3, shock-plate, Fig. 4, washer, Fig. 5, Plate 3, and shock-spring, Figs. 7 and 8, Plate 2, arranged substantially as herein described, in combination with railroad-car boxes, to be constructed and operated substantially as herein described and set forth.

GEORGE F. LYNCH.

Witnesses:
JAMES HICKCOX,
I. P. WALKER.